United States Patent [19]

Mano et al.

[11] 4,238,571

[45] Dec. 9, 1980

[54] PROCESS FOR PRODUCING POROUS MATERIALS

[75] Inventors: Hiroshi Mano; Koichi Okita, both of Osaka, Japan

[73] Assignee: Sumitomo Electric Industries, Ltd., Osaka, Japan

[21] Appl. No.: 918,186

[22] Filed: Jun. 22, 1978

Related U.S. Application Data

[63] Continuation of Ser. No. 706,366, Jul. 19, 1976, abandoned.

[30] Foreign Application Priority Data

Jul. 17, 1975 [JP] Japan .................................. 52-88038
Jul. 17, 1976 [JP] Japan .................................. 52-72063

[51] Int. Cl.$^3$ .............................................. C08J 9/28
[52] U.S. Cl. ...................................... 521/62; 521/63; 521/64
[58] Field of Search ........................................ 521/64

[56] References Cited

U.S. PATENT DOCUMENTS

| | | | |
|---|---|---|---|
| 3,450,650 | 6/1969 | Murata | 521/64 |
| 3,544,489 | 12/1970 | Dowbenko et al. | 521/64 |
| 3,575,897 | 4/1971 | Port et al. | 521/64 |
| 3,620,895 | 11/1971 | Bailey | 521/64 |
| 3,642,668 | 2/1972 | Bailey et al. | 521/64 |
| 3,655,591 | 4/1972 | Seiner | 521/64 |
| 3,752,784 | 8/1973 | Jenkins | 521/64 |
| 3,753,932 | 8/1973 | Jenkins | 521/64 |
| 3,784,488 | 1/1974 | Steinhauer et al. | 521/64 |
| 3,956,201 | 5/1976 | Seiner | 521/64 |

*Primary Examiner*—Morton Foelak
*Attorney, Agent, or Firm*—Sughrue, Rothwell, Mion, Zinn and Macpeak

[57] ABSTRACT

A process for preparing a porous material having a fine pore size which comprises preparing a solution comprising resin comprising a vinylidene fluoride/tetrafluoroethylene copolymer, a vinylidene fluoride polymer or a mixture thereof and at least a solvent for the resin and a non-solvent for the resin, and removing the solvent and the non-solvent from the solution, wherein a part of the resin is dissolved or swollen during the removal of the solvent and non-solvent.

16 Claims, No Drawings

PROCESS FOR PRODUCING POROUS MATERIALS

This is a continuation of application Ser. No. 706,366, filed July 19, 1976, now abandoned.

BACKGROUND OF THE INVENTION

1. Field of the Invention

This invention relates to a process for producing a porous material having improved mechanical strength, uniform fine pore size and superior permeability from a solution of a vinylidene fluoride/tetrafluoroethylene copolymer or a vinylidene fluoride polymer. More specifically, it provides a process for producing a porous membrane having a fine pore size which is useful, for example, for membrane filtration, ultrafiltration and dialysis.

2. Description of the Prior Art

Generally, porous materials are produced by methods such as mixing a blowing agent, blowing gases, mechanical bubbling, solvent or extraction of a resin. The resulting porous materials, however, have a large pore size with non-uniform pores, and become closed celled, and their properties are not satisfactory for practical purposes.

Known methods for producing porous materials using a solvent include those for the production of artificial leathers using a polyurethane-type material and for the production of cellulose membranes, polyvinyl chloride, or polyamides.

In the production of artificial leathers, pore size is scarcely controlled, and such a material is not suitable for use as a membrane.

Porous materials with a controlled pore size are mostly made of cellulose derivatives, and are used for various filtration purposes and dialysis, for example. Membranes made of cellulose derivatives, however, suffer from the defect that because of their inherent properties they are easily attacked by acids, bases or organic solvents, and, moreover, deform under heat or pressure, resulting in deteriorated properties. This has considerably limited the conditions under which these cellulosic membranes can be utilized.

SUMMARY OF THE INVENTION

It is an object of this invention to provide a process for producing a porous material of a fluorine resin which has improved mechanical strength, is free from the various defects of conventional products as described, and also possesses superior properties for use as membranes, such as superior permeability and separability.

The objects of the present invention are achieved by utilizing a resin system composed mainly or completely of a vinylidene fluoride/tetrafluoroethylene copolymer, a vinylidene fluoroide polymer of a mixture thereof, and at least one solvent for the resin(s) involved and at least one non-solvent for the resin(s) involved, and removing the solvent(s) and the non-solvent(s) from the solution, where a part of the resin(s) is/are dissolved or swollen during the removal of the solvent and the non-solvent.

DETAILED DESCRIPTION OF THE INVENTION

The most widely used method for producing porous membranes from a resin solution is a wet method which comprises dissolving the starting resin in a solvent, casting the solution into the desired shape, evaporating off a part of the solvent, and dipping the resulting product in a non-solvent miscible with the solvent to thereby extract the solvent.

On the other hand, a dry method is also known which comprises mixing a resin with a solvent and a non-solvent miscible therewith, casting the mixture into the desired shape, and completely evaporating off the solvent and the non-solvent to form a porous membrane.

It is known that in the wet method, the pore size and permeability of the resulting membrane vary greatly according to differences in the drying time before dipping in the non-solvent bath. In addition, the product frequently shrinks during dipping, and conditions for producing membranes of constant quality are extremely difficult to select.

Since the vinylidene fluoride/tetrafluoroethylene copolymer containing about 40 to about 100 mol% vinylidene fluoride units (in those instances where the proportion of vinylidene fluoride is 100%, of course, one has a homopolymer) used in this invention is soluble in relatively lower ketones or ethers, the use of these compounds as a solvent permits the production of membranes not only by the wet method but also by the dry method above described. Thus, the membrane forming conditions can be selected from a broad range, and the types of porous membranes producible increase. However, attempts to obtain membranes having superior permeability and separability by conventional methods from a solution of a vinylidene fluoride/tetrafluoroethylene copolymer or a vinylidene fluoride polymer only result in reduced mechanical strength. It is the most important object of this invention to improve the mechanical strength of membranes.

The vinylidene fluoride utilized in the present invention is typically commercially available in the format set forth in the Examples. However, vinylidene chloride having a higher or lower intrinsic viscosity can be utilized in accordance with the present invention with equal success, so long as the material has a sufficiently high intrinsic viscosity to be the solid at normal ambient conditions.

In a similar manner, the intrinsic viscosity of any vinylidene fluoride/tetrafluoride ethylene copolymers is not overly important, i.e., exemplary intrinsic viscosities are given in the Examples and any vinylidene fluoride/tetrafluoroethylene copolymer containing at least about 40 mol% vinylidene fluoride units can be utilized in accordance with the present invention, so long as the same is substantially solid at normal ambient conditions.

In membrane formation from resin solutions, the solvent evaporates off from the surface layer of the product which is in contact with air in the step of drying after casting the solution, and, thus, the cohesion of macromolecules occurs. According to the wet method, the product is dipped in a non-solvent at a stage after such surface layer has been formed. Thus, solvent in the lower part of the product (which has not been evaporated) is extracted to form a porous portion having a larger pore size than the surface area. The resulting membrane is generally called an asymmetrical membrane. On the other hand, the ratio between the solvent and the non-solvent changes as the solvent evaporates off, and when the composition of the system becomes such that phase separation of the dissolved polymer is induced, gellation or crystal precipitation begins. Completion of the evaporation results in membranes in which interstices among the resin particles constitute pores. It is believed that the bonding force between the resin particles precipitated in the evaporation-drying process greatly affects the mechanical strength of the resulting porous membrane. The present invention provides a process for producing a porous membrane having improved mechanical strength by increasing this bonding force.

The vinylidene fluoride/tetrafluoroethylene copolymer and vinylidene fluoride polymer used as a membrane-forming material in this invention have a relatively high degree of crystallization, and their particles are easily precipitated from solution. In the porous membranes prepared from such a solution, the resin particles precipitated are connected to one another by fine fibers, and these parts have the lowest mechanical strength and are most susceptible to breakage by external forces. In order to strengthen this portion, we attempted to increase the bonding force between the resin particles by allowing a part of the resin to be dissolved or swollen in the step of removing the liquid components from the resin solution. Extensive investigations along this line led to the discovery that such a method is very effective for increasing the mechanical strength of the resulting porous material. Specific methods of the present invention are described below.

It should be noted in this regard that the thickness of the final product in accordance with the present invention is generally several microns to about 1 cm, though greater thickness can be used when rolling or a like processing is applied as a final processing step.

While not to be construed as limitative, generally the total amount of resin or resins in the system at the beginning of processing in accordance with the present invention is at least about 3%, in total. The maximum amount is not limited in any substantial fashion.

A first method is to use a mixture of solvent 1 and solvent 2 as a solvent for the vinylidene fluoride/tetrafluoroethylene copolymer or the vinylidene fluoride polymer.

Solvent 1 in the solvent mixture used in this invention denotes a compound or compounds capable of dissolving the resins to a concentration of at least 3% at a temperature below the melting point of the vinylidene fluoride/tetrafluoroethylene copolymer or the vinylidene fluoride polymer. Examples of such solvents are ketones such as acetone, methyl ethyl ketone, diethyl ketone, methyl propyl ketone, methyl butyl ketone, methyl isobutyl ketone, and cyclohexanone, and ethers such as tetrahydrofuran, tetrahydropyran, and 1,4-dioxane.

The non-solvent is a liquid uniformly miscible with solvent 1 which does not dissolve the resins when used alone, and which has a lower partial vapor pressure than that of solvent 1 at the time of evaporation and drying. Examples of the non-solvent include alcohols containing 1 to 10 carbon atoms such as methyl alcohol, ethyl alcohol, propyl alcohol, isopropyl alcohol, butyl alcohol, isobutyl alcohol, sec-butyl alcohol, tert-butyl alcohol, pentyl alcohol, hexyl alcohol, and octyl alcohol, and water. The non-solvent should be selected from those having a partial vapor pressure lower than that of solvent 1 at the time of evaporation and drying.

Solvent 2, on the other hand, denotes a liquid which can form a uniform solution together with solvent 1 and the non-solvent, can dissolve or swell the resins, and has a lower partial vapor pressure than those of solvent 1 and the non-solvent at the time of evaporation and drying. Examples of solvent 2 include ketones such as methyl ethyl ketone, diethyl ketone, methyl propyl ketone, methyl butyl ketone, methyl isobutyl ketone, and cyclohexanone, ethers such as tetrahydrofuran, tetrahydropyran, and 1,4-dioxane, N,N-dimethylformamide, N,N-dimethylacetamide, N,N-diethylacetamide, N-methyl-2-pyrrolidone, hexamethylphosphoramide, tetramethylurea, and dimethyl sulfoxide. Solvent 2 should have a lower partial vapor pressure than the non-solvent at the time of evaporation and drying. These solvents and non-solvents are not limited to the pure ones, but may be mixtures of at least two isomers.

The effect of the mixed solvent used by the inventors is extremely great. In the course of evaporating off the solvents after casting the resin solution in the mixed solvent, solvent 1 first evaporates off, the proportion of the non-solvent in the remaining solvent increases, and the resin particles precipitate. On continuing the evaporation and drying, the non-solvent also evaporates off together with solvent 1 and solvent 2 remains. The remaining solvent 2 partly re dissolves the resin particles precipitated, and serves to strongly bond the resin particles to one another. This brings about an increase in the mechanical strength of the resulting porous membrane. Since the viscosity of the solution, the speed of drying, the speed of precipitating the resin particles, and the size of the precipitated particles can be freely selected by changing the mixing ratio of the mixed solvent, it is very easy to control the pore size of the resulting porous membrane, and porous membranes of uniform quality having a fine pore size can be obtained. This is a great effect of adding solvent 2 as a third component. It has been empirically confirmed that membranes of various pore sizes can be produced by changing the combinations of the solvents, and the mixing ratios of the solvents.

The proportion of solvent (1) to solvent (2) and the non-solvent can be freely varied according to the desired characteristics of the membrane product.

As a result of selecting solvents having a relatively low boiling point as solvent 2 in the mixed solvent, not only can a wet method in which the cast product is dipped in a non-solvent such as water or alcohols be practiced, but also a dry method which does not require such a dipping step can be employed in the present invention to afford many varieties of porous membranes having high quality and well controlled pore sizes. The employment of a dry method makes continuous production extremely easy in addition to the case of controlling the pore size by using the mixed solvent and to increasing mechanical strength. This is also a characteristic feature of the present invention.

A second method is to use a mixture of a plurality of resins selected from vinylidene fluoride/tetrafluoroethylene copolymers of different copolymerization ratios and a vinylidene fluoride polymer. When there is a difference of 5 to 60 mole% in the vinylidene fluoride content, the vinylidene fluoride-tetrafluoroethylene copolymers differ in properties such as their degree of crystallization, melting point, and solubility. It is most preferred, in accordance with this embodiment of the present invention, that each of the different components comprise from about 10 to about 90% of vinylidene fluoride in combination with from about 90 to about 10% tetrafluoroethylene, both molar. As earlier mentioned, the intrinsic viscosity of the materials is not especially limited, exemplary intrinsic viscosity being given in the Examples, and any such materials can be used successfully so long as they are solid at normal ambient conditions.

When melting point is considered as one property of a copolymer of vinylidene fluoride and tetrafluoroethylene, it is appreciated that the melting point progressively decreases from 169° C., the melting point of a homopolymer of vinylidene fluoride, according to the proportion in mole% of tetrafluoroethylene, and reaches a minimum of 110° C. when the amount of tetrafluoroethylene is 23 mole%. When the mole% of the tetrafluoroethylene increases, the melting point of the copolymer rises, and finally reaches 327° C. which is the melting point of a tetrafluoroethylene polymer. This tendency is shown in Table 1.

The solubility of the copolymer in a solvent is related to its melting point, and copolymers having a lower melting point are soluble in more solvents. On the other hand, with high melting points, the copolymers are soluble only in solvents having high polarity. A tetrafluoroethylene polymer having the highest melting point is completely insoluble.

The degree of crystallization of the copolymer also increases with higher melting points, though varying somewhat according to the polymerization conditions. Accordingly, when two copolymers which differ in their vinylidene fluoride content by 5 to 60 mole% are mixed, and a membrane is formed from a solution of the mixture, the resin particles precipitate in two stages in the process of solvent evaporation. Specifically, according to their differences in solubility, one of the copolymers first precipitates to form a nucleus, and the other is partly dissolved, or swollen. As the evaporation of the solvent further proceeds, the latter also precipitates around the first-precipitated resin particles as a nucleus, thus serving to connect them to one another. For this reason, the mechanical strength of the resulting membrane is markedly improved over that of a membrane prepared from a single copolymer. In this case, three or more copolymers with different copolymerization ratios can also be mixed, and further effects are achieved by varying the mixing ratios.

A third method is to use a mixture of vinylidene fluoride/tetrafluoroethylene copolymers having different degrees of polymerization. The difference in the degree of polymerization means that there is a difference of at least 1 in the intrinsic viscosities of the polymers measured in N,N-dimethylacetamide at 35° C. In this case, too, the solvent solubilities of the resins differ from each other. In this regared, any difference in intrinsic viscosities which results in a difference in resin solubility can be utilized in this method in accordance with the present invention. However, as one skilled in the art will appreciate, generally the greater the difference in intrinsic viscosities, the greater the effect.

The solubility C of a resin having the same composition is given by the following equation, $$C = A + (B/Mn)$$

wherein Mn is the number average molecular weight of the resin, and A and B are constants determined by the resin composition, the solvent, the temperature, etc.

It will be apparent from the above equation that the solubility decreases with increasing number average molecular weight. When copolymers of the same composition are mixed so as to broaden the molecular weight distribution, and the mixture is dissolved in a solvent, a copolymer having a higher molecular weight first precipitates to form a nucleus. At this time, the lower molecular weight component is partly dissolved, or swollen. The larger the size of the molecules firstly precipitated, the larger is the number of molecules which are partly dissolved, or swollen. Consequently, it is believed that the mechanical strength of fine fibers occurring among the precipitated particles increases, and the number of the fibers also increases and the fibers tend to become thicker. In this way, the molecular weight distribution of a mixture of copolymers of the same composition can be broadened by adding a very small amount of a high-molecular-weight component.

A fourth method is to use a mixture of solutions containing the resin to different degrees of dissolution. Any of the resins earlier described can be used in this fourth method. Generally, the degree of dissolution of a resin, particularly in a polar solvent such as those used in the present invention, is characterized by differences in the degree of solvation of the solvent with the resin. In other words, a well dissolved state is a state wherein the solvation of the solvent with the resin is complete. The solvation becomes closer to completeness as the solution is heated at higher temperatures and stirred to a greater degree. Accordingly, when in the preparation of resin solutions one resin is dissolved with stirring at a high temperature and another resin is dissolved at a lower temperature, the former solution shows a more advanced degree of solvation than the latter solution. When solutions prepared at temperatures differing from each other by at least 5° C. are cooled to substantially the same temperature and mixed, and the mixture is used for membrane formation, a resin having a lower degree of solvation first precipitates as small particles, and a resin having a higher degree of solvation is partly dissolved, or swollen. In this case, too, it is believed that the resin which precipitates later connects the first precipitated nuclei particles to greatly improve the mechanical strength of the resulting membrane. It should be noted, in this regard, that the preferred maximum temperature difference between the temperature of mixing the systems initially to form the same is not overly important, but for practical reasons (as will be apparent to one skilled in the art), the difference is never greater than the difference between the freezing point and the boiling point of the solvent, and, accordingly, systems will always be initially mixed to form the same at a temperature between the freezing point and the boiling point of the respective solvents involved.

Solvation with crystalline polymers is higher than that with amorphous polymers. Even the crystalline polymers, when examined microscopically, are a composite consisting of microcrystalline portions and amorphous portions. The solvent first dissolves the amorphous portion, and then progressively dissolves the microcrystals starting at their surfaces. In a certain period during the polymerization, this crystalline portion is sometimes aligned as a particularly stable crystalline structure, or where there is a portion containing particularly large crystals, a quasi-stable state results in which the nuclei of the crystalline portion are not fully dissolved even under conditions which can dissolve the amorphous portion and the microcrystalline portion. When the solutions is stirred at a high temperature, the nuclei of the crystalline portion not fully dissolved gradually dissolves, and the number of nuclei decreases. As solvation proceeds in this way, the dissolved molecules spread throughout the solution as if the molecular weight of the solute were increased. Consequently, the viscosity of the solution is increased. It is known that particles precipitated from a solution in which solvation has so proceeded are generally large in size and high in mechanical strength, but that when the size of the particles becomes too large, their strength rather decreases. It is believed that when solutions having different degrees of solvation are mixed, a resin with a lower degree of solvation first precipitates to form particle nuclei, and as these particles grow, a resin having a higher degree of solvation is taken thereinto and also simultaneously incorporated into the fine interstices of the fibrous portions among the particles.

It should be noted, in this regard, that with respect to the fourth method of the present invention (as is the case with the earlier methods, so long as, with method 2 the intrinsic viscosity difference is met) that the intrinsic viscosity of the materials selected for the processing in accordance with the fourth method of invention is not overly important, with representative values being given in the Examples, so long as the materials selected are solid at normal ambient temperatures.

As described hereinabove, several specific methods of this invention are available. These methods can be used alone, or a greater effect can be expected by using them in combination. Under well controlled conditions, these methods can easily afford homogeneous membranes having a pore size ranging from 0.01 $\mu$m to 10 $\mu$m.

The vinylidene fluoride polymer and vinylidene fluoride/tetrafluoroethylene copolymer have high resistance to radiation, and the resulting membranes can be sterilized by irradiation which is the simplest and most complete sterilizing means. Furthermore, these polymers have good heat stability, and the resulting membranes can be used at relatively high temperatures. Moreover, these membranes are resistant to attack by acids or bases. These characteristics are not observed in conventional cellulosic membranes.

The porous membranes obtained by the process of this invention are very useful in applications which utilize their controlled porosity with uniform pore sizes, thinness with high mechanical strength, resistance to radiation, thermal stability, and resistance to acids and bases, etc. Main usages include, for example, membranes for artificial organs such as artificial lungs, artificial gills, artificial skin or artificial kidneys, diaphragms for electrolytic cells and battery cells, general filtration membranes for chemicals, membranes for the separation, concentration and recovery of foodstuffs such as proteins and starches, membranes for the treatment of waste liquors such as acid and alkali waste liquors, and oil-water separating membranes.

The following Examples illustrate the present invention specifically.

The characteristics of the resins used in these examples are shown in Table 1. The intrinsic viscosities of the resins shown in Table 1 are those measured at 35° C. in N,N-diemthylacetamide.

Referring to Table 4, the bubble point represents the pressure of a bubble which has first passed through a sample membrane when a pneumatic pressure is applied to one surface of the sample membrane immersed in isopropyl alcohol. The permeability of the membrane is shown by the Gurley number (seconds) based on the permeation of air. The porosity is the percentage of the volume of pores based on the apparent volume of the membrane. The tensile strength is the value obtained by dividing the maximum stress, which is attained when a 2 cm-wide sample is pulled at a rate of 10 cm/min. between heads spaced from each other a distance of 2 cm. by the apparent cross-sectional area of the membrane. The matrix strength is the value obtained by dividing the tensil strength by [1-(porosity (%)/100)]. The tear strength is the value obtained by dividing the maximum stress, which is attained when a sample punched out for a right angle tear test is torn off at a rate of 5 cm/min. through a space between heads separated from each other by a distance of 2.5 cm, by the thickness of the membrane.

Generally, the mechanical strength of a membrane abruptly decreases with increasing pore size. Accordingly, for comparison of strengths, it is necessary to compare membranes having the same pore size. In Table 4, membranes having the same pore size were employed in comparisons with regard to Examples. As regards the tensile strength comparison was made between membranes having different porosities, and, therefore, their matrix strength values are also shown in Table 4. Hence, in comparing Examples with the corresponding Comparative Examples, it is sufficient to compare the matrix strength values of membranes having the same mean pore size with each other.

In Examples 1 to 10, two types of solvents were used. Examples 11 to 14 relate to the case wherein resins with vinylidene fluoride contents differing from each other by at least 5 mole% were mixed. Example 15 is an example in which resins having diffeent degrees of polymerization were mixed. In Example 16, solutions having different degrees of solvation of the solvent with the resin were mixed.

EXAMPLES 1 to 6 AND COMPARATIVE EXAMPLES 1 TO 4

Resin C was mixed with each of the solvents and non-solvents in the proportions shown in Table 2, and the mixture stirred at 25° C. to form a solution. The solution was spread to a thickness of 0.80 mm on a smooth plate using a knife coater, and then air dried under the conditions shown in Table 2. The resulting membrane was stripped off from the plate, and tested for various properties. The results are shown in Table 4.

EXAMPLE 7 AND COMPARATIVE EXAMPLE 5

A mixture consisting of 10% of Resin B-1, 61% of acetone, 9% of N,N-dimethylformamide and 20% of isopropyl alcohol was dissolved with stirring at 25° C. The solution was spread to a thickness of 0.80 mm, air dried at 22° C. for 40 minutes, and subsequently, immersed in water at 20° C. for 30 minutes. The properites of the membrane obtained were measured, and the results are shown in Table 4. On the other hand, as Comparative Example 5, the properties of a membrane having an equivalent pore size and obtained from a mixed solution of Resin B-1, acetone, and isopropy alcohol were measured, and the results are also shown in Table 4.

EXAMPLE 8 AND COMPARATIVE EXAMPLE 6

A mixture consisting of 9% of Resin E, 76% of acetone, 5% of methyl ethyl ketone and 10% of isopropyl alcohol was dissolved with stirring at 25° C. The solution was spread to a thickness of 1.25 mm, and then air dried at 17° C. for 20 minutes. The properties of the resulting membrane were measured, and the results are shown in Table 4. As comparative Example 6, the properites of a membrane having an equivalent pore size and obtained from a mixed solution of Resin E, acetone and isopropyl alcohol were measured, and the results are also shown in Table 4.

EXAMPLE 9 AND COMPARATIVE EXAMPLE 7

A mixture consisting of 9% of Resin E, 75% of acetone, 1% of N,N-dimethylformamide and 15% of isopropyl alcohol was dissolved with stirring at 25° C. The solution was spread to a thickness of 1.00 mm, air dried at 18° C. for 15 minutes, and subsequently air dried at 50° C. for 15 minutes. Then, the film was immersed in water at 20° C. for 30 minutes. The properties of the resulting membrane were measured, and the results are shown in Table 4. On the other hand, as Comparative Example 7, the properties of a membrane having an equivalent pore size and obtained from a mixed solution of Resin E, acetone and isopropyl alcohol were measured, and the results are also shown in Table 4.

EXAMPLE 10 AND COMPARATIVE EXAMPLE 8

A mixture consisting of 9% of Resin F, 80% of acetone, 1% of methyl ethyl ketone and 10% of isopropyl alcohol was dissolved with stirring at 25° C. The solution was spread to a thickness of 1.50 mm, and air dried at 21° C. for 20 minutes. The properties of the resulting membrane were measured, and the results are shown in Table 4. On the other hand, as Comparative Example 8, the properties of a membrane having an equivalent pore size and obtained from a mixed solution of Resin F, acetone and isopropyl alcohol were measured, and the results are also shown in Table 4.

EXAMPLES 11 TO 14 AND COMPARATIVE EXAMPLES 9 TO 11

A mixture consisting of 10% of each of the mixed resins (1:1 weight ratio) shown in Table 3, 80% of acetone and 10% of isopropyl alcohol was dissolved with stirring at each of the dissolving temperatures shown in Table 3. Each of the solutions obtained was formed into a film under the conditions shown in Table 3. The properties of the membranes obtained were measured, and the results are shown in Table 4.

EXAMPLE 15 AND COMPARATIVE EXAMPLE 12

A mixture consisting of 7% of Resin B-1, 3% of Resin B-2, 70% of acetone and 20% of isopropyl alcohol was dissolved with stirring at 40° C. The solution was spread to a thickness of 0.80 mm, and air dried at 25° C. for 10 minutes. The properties of the membrane obtained were measured, and the results are shown in Table 4. On the other hand, as Comparative Example 12, the properties of a membrane having an equivalent pore size and obtained from a solution of Resin B-1 alone were measured, and the results are shown also in Table 4.

EXAMPLE 16 AND COMPARATIVE EXAMPLE 13

A mixture consisting of 9% of Resin E, 67% of acetone, 12% of methyl ethyl ketone and 12% of isopropyl alcohol was dissolved with stirring at 20° C. Separately, a mixture of the same formulation was dissolved with stirring at 45° C., and then cooled to 20° C. The former and the latter were mixed in a weight ratio at 2:1 at 20° C. The mixture was spread to a thickness of 1.50 mm, and air dried at 21° C. for 25 minutes. The properties of the membrane obtained were measured, and the results are shown in Table 4. On the other hand, as Comparative Example 13, the properties of a membrane having an equivalent pore size and obtained from a solution obtained by dissolving Resin E at 20° C. were measured, and the results are also shown in Table 4.

TABLE 1

| Resin | Composition of copolymer | | Melting point (°C.) | Intrinsic viscosity [η] |
|---|---|---|---|---|
| | Vinylidene flouride (mole%) | Tetraflouroethylene (mole%) | | |
| A | 95.8 | 4.2 | 145 | 2.61 |
| B-1 | 87.5 | 12.5 | 129 | 2.82 |
| B-2 | 87.5 | 12.5 | 130 | 3.82 |
| C | 78.8 | 21.2 | 118 | 2.20 |
| D | 76.9 | 23.1 | 111 | 3.0 |
| E | 69.3 | 30.7 | 140 | 2.38 |
| F | 65.5 | 34.5 | 132 | 3.00 |
| G | 100 | — | 165 | 1.85 |
| H | — | 100 | 327 | — |

TABLE 2

| Example (Ex) or Comparative Example (Com. Ex.) | Formulation of solution (%) | | | | Dissolving temperature (°C.) | Thickness of solution spread (mm) | Drying temp. (°C.) | Drying time (minutes) |
|---|---|---|---|---|---|---|---|---|
| | Resin C | Acetone | Methyl ethyl ketone | Isopropyl alcohol | | | | |
| Ex. 1 | 10 | 39 | 17 | 34 | 25 | 0.80 | 25 | 10 |
| Ex. 2 | 10 | 63 | 9 | 18 | 25 | 0.80 | 23 | 10 |
| Ex. 3 | 10 | 45 | 9 | 36 | 25 | 0.80 | 25 | 10 |
| Ex. 4 | 10 | 47 | 9 | 34 | 25 | 0.80 | 27 | 10 |
| Ex. 5 | 11 | 63 | 5 | 21 | 25 | 0.80 | 27 | 10 |
| Ex. 6 | 10 | 61 | 9 | 20 | 25 | 0.80 | 21 | 20 |
| Com. Ex. 1 | 10 | 69 | — | 21 | 25 | 0.80 | 26 | 10 |
| Com. Ex. 2 | 10 | 64 | — | 26 | 25 | 0.80 | 25 | 10 |
| Com. Ex. 3 | 10 | 56 | — | 34 | 25 | 0.80 | 25 | 10 |
| Com. Ex. 4 | 10 | 56 | — | 34 | 25 | 0.80 | 26 | 10 |

TABLE 3

| Runs | Resin | Dissolving temperature (°C.) | Thickness of the solution spread (mm) | Drying temperature (°C.) | Drying time (minutes) |
|---|---|---|---|---|---|
| Example 11 | A + C | 45 | 1.00 | 20 | 15 |
| Example 12 | C + F | 20 | 1.50 | 20 | 20 |
| Example 13 | A + F | 45 | 1.00 | 22 | 15 |
| Example 14 | A + E | 45 | 1.00 | 21 | 15 |
| Comparative Example 9 | C + D | 30 | 1.00 | 22 | 13 |
| Comparative Example 10 | E + F | 45 | 1.50 | 23 | 20 |
| Comparative Example 11 | E + F | 45 | 1.00 | 22 | 10 |

TABLE 4

| Example (Ex.) and Comparative Example (Com. Ex.) | Mean pore size (μm) | Thickness (μm) | Bubble point (kg/cm$^2$) | Gurley (sec) | Porosity (%) | Tensile strength (kg/mm$^2$) | Matrix strength (kg/mm$^2$) | Tear strength (kg/mm) |
|---|---|---|---|---|---|---|---|---|
| Ex. 1 | 0.09 | 55 | 1.47 | 187 | 49 | 0.47 | 0.92 | 1.80 |
| Ex. 2 | 0.11 | 87 | 1.23 | 59 | 51 | 0.44 | 0.90 | — |
| Ex. 3 | 0.22 | 78 | 1.01 | 48 | 60 | 0.26 | 0.65 | 1.54 |
| Ex. 4 | 0.26 | 76 | 0.93 | 30 | 64 | 0.25 | 0.69 | 1.46 |
| Ex. 5 | 0.31 | 80 | 0.78 | 38 | 54 | 0.37 | 0.80 | — |
| Ex. 6 | 0.43 | 74 | 0.59 | 8 | 69 | 0.21 | 0.68 | 0.60 |
| Comp. Ex. 1 | 0.09 | 97 | 1.39 | 44 | 55 | 0.28 | 0.62 | — |
| Comp. Ex. 2 | 0.23 | 96 | 1.04 | 18 | 63 | 0.21 | 0.57 | — |
| Comp. Ex. 3 | 0.28 | 85 | 0.86 | 20 | 71 | 0.16 | 0.55 | — |
| Comp. Ex. 4 | 0.35 | 90 | 0.71 | 15 | 73 | 0.11 | 0.41 | 0.58 |
| Ex. 7 | 0.42 | 69 | 0.60 | 14 | 55 | 0.24 | 0.53 | — |
| Comp. Ex. 5 | 0.38 | 88 | 0.66 | 18 | 73 | 0.09 | 0.33 | — |
| Ex. 8 | 0.06 | 57 | 1.98 | 315 | 70 | 1.61 | 5.37 | 4.66 |
| Comp. Ex. 6 | 0.06 | 43 | 1.99 | 500 | 41 | 0.86 | 1.46 | 2.60 |
| Ex. 9 | 0.17 | 74 | 1.17 | 145 | 48 | 0.59 | 1.13 | 3.37 |
| Comp. Ex. 7 | 0.16 | 37 | 1.19 | 150 | 65 | 0.32 | 0.91 | 2.24 |
| Ex. 10 | 0.08 | 74 | 1.53 | 750 | 48 | 0.92 | 1.77 | 5.89 |
| Comp. Ex. 8 | 0.08 | 118 | 1.49 | 150 | 60 | 0.33 | 0.83 | 2.52 |
| Ex. 11 | 0.06 | 52 | 2.03 | 600 | 32 | 1.64 | 2.41 | 11.77 |
| Ex. 12 | 0.07 | 109 | 1.83 | 309 | 50 | 0.89 | 1.78 | 5.63 |
| Ex. 13 | 0.09 | 71 | 1.39 | 1280 | 39 | 0.69 | 1.13 | 4.35 |
| Ex. 14 | 0.40 | 77 | 0.63 | 130 | 50 | 0.63 | 1.26 | 3.86 |
| Com. Ex. 9 | 0.07 | 78 | 1.68 | 87 | 50 | 0.51 | 1.02 | 3.92 |
| Com. Ex. 10 | 0.08 | 100 | 1.64 | 216 | 53 | 0.42 | 0.89 | 3.33 |
| Com. Ex. 11 | 0.26 | 66 | 0.94 | 42 | 53 | 0.35 | 0.74 | 2.76 |
| Ex. 15 | 0.09 | 79 | 1.41 | 54 | 53 | 0.68 | 1.45 | — |
| Com. Ex. 12 | 0.09 | 85 | 1.39 | 50 | 55 | 0.46 | 1.02 | — |
| Ex. 16 | 0.08 | 80 | 1.55 | 125 | 44 | 0.69 | 1.23 | 2.52 |
| Com. Ex. 13 | 0.08 | 78 | 1.49 | 130 | 43 | 0.60 | 1.05 | — |

While the invention has been described in detail and with reference to specific embodiments thereof, it will be apparent to one skilled in the art that various changes and modifications can be made therein without departing from the spirit and scope thereof.

What is claimed is:

1. A process for preparing a porous material having a fine pore size which comprises: (1) preparing a solution containing at least one resin, wherein the resin or resins are selected from the group consisting of a vinylidene fluoride/tetrafluoroethylene copolymer, a vinylidene fluoride homopolymer or a mixture thereof, and at least one solvent for said resin or resins and a non-solvent for said resin or resins, wherein said non-solvent has a partial vapor pressure lower than that of said at least one solvent, and is miscible with said solvent, provided that more than one resin and/or more than one solvent is present; (2) evaporating the solvent and the non-solvent from said solution, and thereby first forming a network of precipitated resin and thereafter bridging that network with subsequently precipitated resin.

2. The process of claim 1 wherein said resin is a vinylidene fluoride/tetrafluoroethylene copolymer containing at least 40 mol% of vinylidene fluoride units.

3. A process for preparing a porous material having a fine pore size which comprises preparing a solution containing a resin selected from the group consisting of a vinylidene fluoride/tetrafluoroethylene copolymer and a vinylidene fluoride homopolymer, a first solvent capable of dissolving the resin to a concentration of at least 3% at a temperature below the melting point of the resin, a non-solvent miscible with said first solvent incapable of dissolving said resin when used alone and having a lower vapor pressure than said first solvent, and a second solvent for said resin miscible with said first solvent and having a lower vapor pressure than said first solvent and said non-solvent; and evaporating said solvents and non-solvent whereby said solvents and non-solvent evaporate in order of their respective vapor pressures and upon first evaporation of said first solvent said resin is precipitated, upon further evaporation of said non-solvent a part of said resin is redissolved and upon finally evaporating said second solvent the redissolved resin is reprecipitated to thereby strengthen the porous material.

4. The process of claim 3 wherein solvent (1) is acetone, solvent (2) is methyl ethyl ketone, and the non-solvent is isopropyl alcohol.

5. The process of claim 3 wherein solvent (1) is acetone, solvent (2) is N,N-dimethylformamide, and the non-solvent is isopropyl alcohol.

6. A process for preparing a porous material having a fine pore size which comprises preparing a solution of two or more resins, a solvent and a non-solvent for said resins; said resins having different solubilities in said solvent and non-solvent and being selected from the group consisting of vinylidene fluoride/tetrafluoroethylene copolymers of different copolymerization ratios and vinylidene fluoride homopolymer; removing the solvent and non-solvent from said solution such that first, one of said resins is precipitated to form a network of precipitated material while the other remains at least partially dissolved and subsequently the partially dissolved resin precipitates around said first precipitated resin to thereby bridge the network and strengthen the material.

7. The process of claim 6, wherein at least two of the resins in the mixture have vinylidene fluoride contents differing from each other by at least 5 mole%.

8. A process for preparing a porous material having a fine pore size which comprises preparing a solution of a mixture of vinylidene fluoride/tetrafluoroethylene copolymers having different degrees of polymerization, a solvent and a non-solvent; removing the solvent and non-solvent from said solution such that first, one of said resins is precipitated to form a network while the other is at least partially dissolved and subsequently the other resin is precipitated around said first precipitated resin to thereby bridge the network and strengthen the material.

9. The process of claim 8 wherein at least two resins in the mixture have intrinsic viscosities in N,N-dimethylacetamide at 35° C. differing from each other by at least 1.

10. The process for preparing a porous material having a fine pore size which comprises combining two or more solutions of resins selected from the group consisting of vinylidene/tetrafluoroethylene copolymers and vinylidene fluoride homopolymers, a solvent and a non-solvent, said solutions containing the resin in different degrees of solution; removing the solvent and non-solvent from said solution; precipitating one of said resins to form a network while the other is at least partially dissolved; preciptitating the other resin around said first precipitated resin to thereby bridge said network and strengthen the microporous material.

11. The process of claim 10 wherein at least two solutions in the mixture are prepared at temperatures differing from each other by at least 5° C.

12. A porous material prepared by the process of claim 1.

13. A porous material prepared by the process of claim 1.

14. A porous material prepared by the process of claim 3.

15. A porous material prepared by the process of claim 6.

16. A porous material prepared by the process of claim 8.

* * * * *